Nov. 16, 1954  B. FRANTELLIZZI  2,694,286
ELECTRICALLY CONTROLLED DEVICE FOR THE AUTOMATIC WINDING
UP OF A SPRING ACTUATED CLOCKWORK OR THE LIKE
Filed April 23, 1953
2 Sheets-Sheet 1

INVENTOR.
BIAGIO FRANTELLIZZI
BY
*T. John Michael*
ATTORNEY

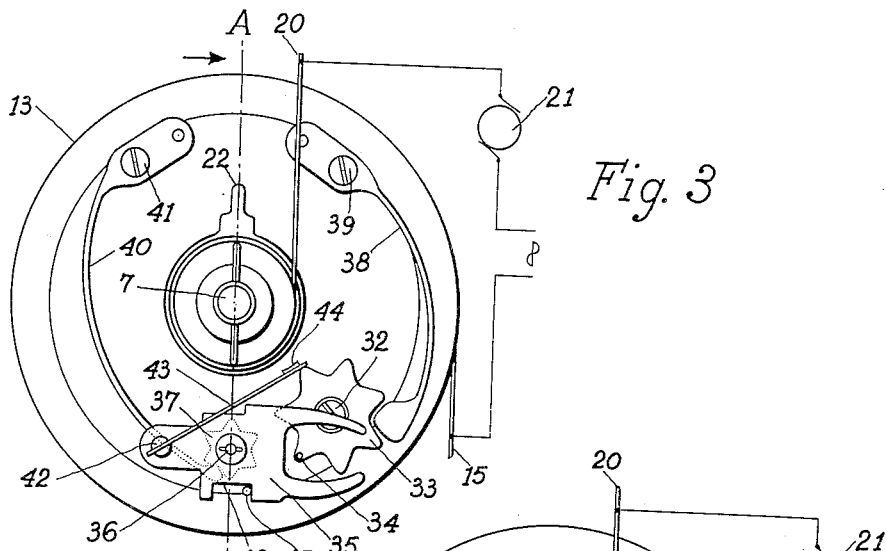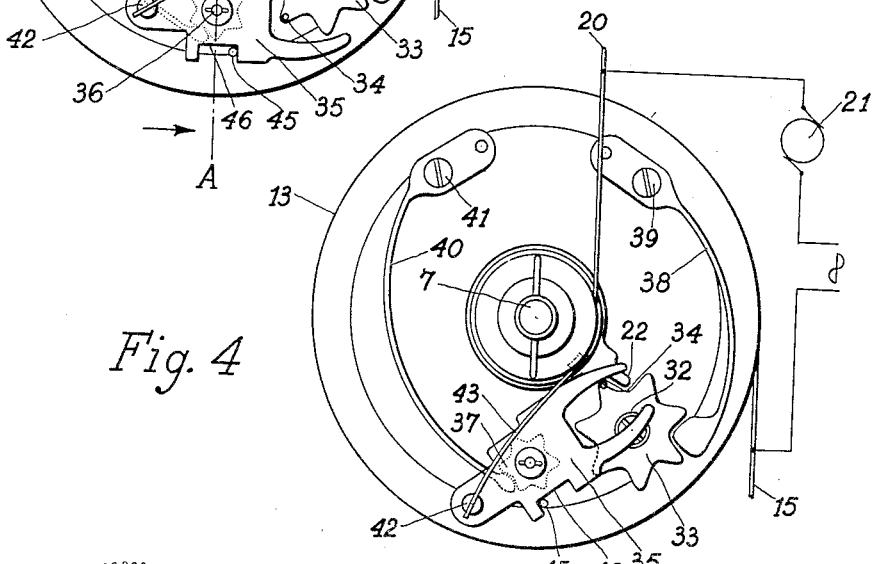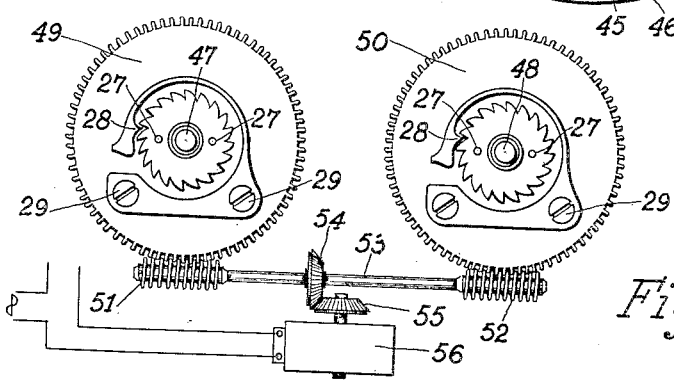

United States Patent Office 2,694,286
Patented Nov. 16, 1954

2,694,286
ELECTRICALLY CONTROLLED DEVICE FOR THE AUTOMATIC WINDING UP OF A SPRING ACTUATED CLOCKWORK OR THE LIKE

Biagio Frantellizzi, Rome, Italy

Application April 23, 1953, Serial No. 350,669

3 Claims. (Cl. 58—41)

The object of this invention is an electrically controlled device for the automatic winding up of a spring actuated clockwork or the like.

More specifically, the object of this invention is a contrivance for fully winding up again a clockwork or like apparatus as soon as this has partially become unwound to a predetermined extent, if at the moment that said predetermined unwinding extent is reached a current flows in the electric circuit of the device, or else, should the current be lacking at that moment, for carrying out the full winding up of the clockwork, or the like, as soon as the current is fed again.

Generally speaking, and reference being made by way of example to the instance of a clockwork where the spring, when unwinding, imparts a turning movement to a barrel in which it is enclosed, the device forming the object of this invention comprises the following parts, in combination which such clockwork: an electric motor, to which the current is supplied by any suitable source; a reduction gearing connecting the electric motor to the winding shaft of the clockwork to bring about the rotation of said shaft in the spring winding direction, when the electric motor rotates; means preventing the spring winding shaft from accomplishing any movements in the opposite direction to the winding direction; a single-direction coupling, connecting the spring winding shaft to said mechanical drive to allow the winding shaft to be turned by hand in the spring winding direction without any action on the mechanical drive; an electric switch in series with one of the feeding conductors for the electric motor and mechanically controlled to close and open the circuit by parts associated with the spring barrel and by parts associated with the winding shaft, these parts being so designed and arranged that the switch will open when the spring is fully wound up and will close when the spring is unwound to a predetermined extent, thus causing, if a current flows in the circuit, the operation of the electric motor, and consequently, the winding up again of the spring, this switch, however, remaining in its closed position if the current is lacking, without hindering a further winding off of the spring or the working of the clockwork, in order to cause the operation of the electric motor, and consequently, the winding up of the spring, when a current is fed again.

The invention also comprises contrivances by which the closing and the opening of the switch take place instantaneously, in order to prevent sparks and imperfect contacts.

The invention will be set forth in detail with reference to the accompanying drawings which show two embodiments thereof by way of example only, it being understood that the description and drawings are not to be construed in an exclusive or limiting sense.

In the drawings:

Fig. 1 is an axial section of the spring, barrel, and winding shaft of a clockwork fitted with the device according to this invention, in the condition where the switch is open and the spring has unwound by one turn from the fully wound up condition, the mechanical drive between the electric motor and the gear concentric with the spring winding shaft having been omitted, and the section having been made on line A—A of Figs. 2 and 3, looking in the direction of arrows;

Fig. 3 is a view from the right of Fig. 1, the parts situated on the right of line B—B in that figure, as well as the supporting plates, having been omitted;

Fig. 4 is a similar view to Fig. 3, but showing the switch in its closed position;

Fig. 5 shows an embodiment wherein a single electric motor simultaneously causes the winding up of two springs, for instance of the two springs for the clockwork and for the time striking mechanism respectively, in a striking clock.

Figure 1:
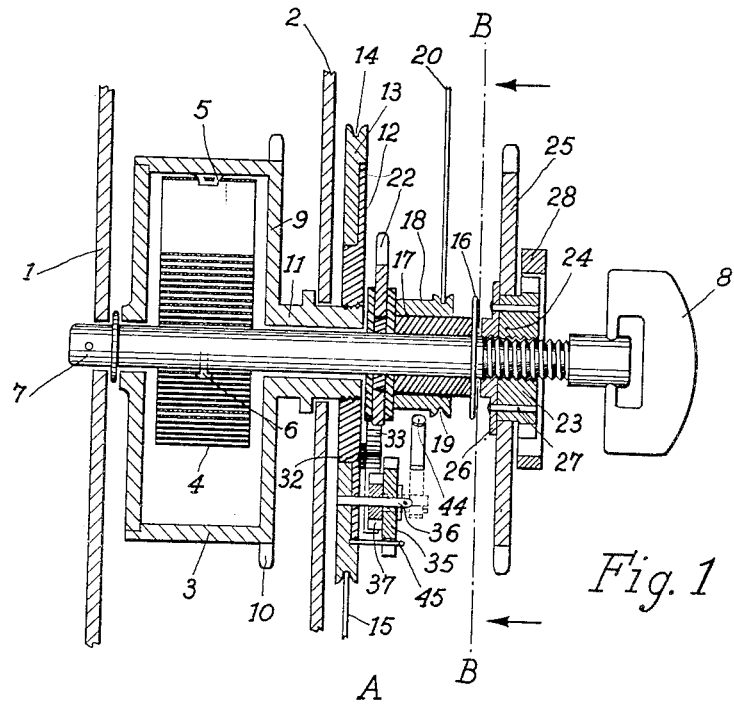
Figure 2:
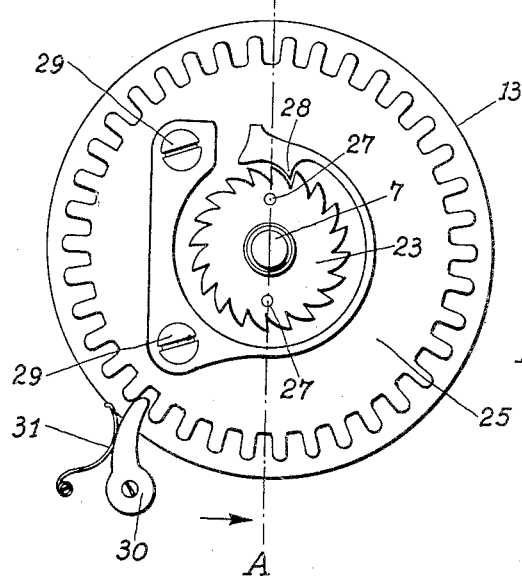
Figs. 2 is a view from the right of Fig. 1, the key for winding up the spring by hand as well as the supporting plates having been omitted.

In the drawing, reference is particularly made to an usual clock mainspring the full winding up of which involves seven turns. In Fig. 1, 1 and 2 are two supporting plates of the clockwork, 3 is the barrel for mainspring 4 whose outer end is fastened to barrel 3 at 5 while its inner end is fastened to the winding shaft 7 at 6, in the usual way. At the upper end of winding shaft 7 there is screwed a key 8 for winding up the spring by hand.

The right hand wall 9 (looking at Fig. 1) of barrel 3, which wall carries the gear rim 10 engaging with the mechanism, not shown, actuated by the spring, is provided with a concentric hub 11 passing through plate 2 and rotatably supported by the latter; at the end of hub 11 there is fixed, as by screw threads, a disc 12 made of an insulating material, firmly fitting in a metal or conductor ring or annulus 13 provided with a peripheral groove 14 in which a brush 15 connected to one conductor of the feeding cable rests with good electric contact. As shown in Fig. 1, the peripheral edge of the insulating disc 12 overlaps the inner edge of conductor ring or annulus 13.

On the winding shaft 7, which is rotatably supported by plate 1 and bush 11, is fixed, by means of a diametrical pin 16, a concentric insulating member 17 bound with a metal sleeve 18 provided with a peripheral groove 19 where a brush 20 rests with good electric contact, this brush being connected by means of a conductor to one of the terminals of an electric motor 21 the other terminal of which is connected to the second conductor of the feeding cable.

To the insulating member 17 is also fixed a radially extending finger 22, which is electrically insulated from metal sleeve 18 and from winding shaft 7.

On the winding shaft 7 there is also fixed, e. g. by means of screw threads, a ratchet wheel 23 having a projecting hub 24 about which is loosely arranged a gear 25 supported by a washer 26 fixed to ratchet wheel 23 by means of rivets 27, so that gear 25 is restrained from displacements in an axial direction.

A spring pawl 28 fixed to gear 25 by means of screws 29 and resiliently engaging ratchet wheel 23, causes the ratchet wheel to follow the motion of gear 25 when the latter rotates in a clockwise direction as viewed in Fig. 2. On the contrary, pawl 28 will remain inoperative when gear 25 is stationary and wheel 23 turns in a clockwise direction, e. g. when the clockwork is wound up by hand with key 8.

A catch 30, subjected to the action of a spring 31, prevents any movements of gear 25 in a counter-clockwise direction as viewed in Fig. 2.

The gear 25 is the gear that is driven by motor 21, when the latter turns, through a reduction gearing not shown.

A pin 32 is fixed to disc 12—13 with good electric contact with metal ring 13, this pin serving as the rotation pivot for a star wheel 33 which is driven by finger 22 when a turning movement takes place between shaft 7 and spring barrel 3.

As shown in the drawing, and as is preferred in this embodiment of the invention, owing to the fact that the full winding up of the clockwork involves seven turns of the winding shaft, star wheel 33 has seven points. A correspondence between the number of star wheel points and the number of winding turns is a preferable but not necessary condition, as those skilled in the art will readily understand. From star wheel 33 a pin 34 projects at right angles, which, in the positions of the device as shown in Figs. 3 and 4, is located between the arms of a fork 35 which is swingable about a pin 36 and is fastened to or integral with a small star wheel 37, co-axial with pin 36; this star wheel 37 might also be substituted by a sector comprising only three teeth forming two stop recesses. A flat spring 38 anchored at 39 has its free end so shaped as to fit any of the recesses between the points of star wheel 33, this spring therefore serving the double purpose of determining the successive positions of the star wheel 33 whenever the latter is moved by finger 22 and of causing the movement from one position to the other to take place almost instantaneously. A spring 40 anchored at 41 and whose end is shaped to fit any of the recesses between the points of star wheel 37, works with respect to star wheel 37, in a similar manner to spring 38 in respect to star wheel 33. To fork 35 is fastened at 42 a spring 43 carrying a contact point 44 at its end.

On their edges facing each other, the two arms of fork 35 are shaped in such a way that pin 34, by moving in one direction or in the other, as will be explained hereinafter, will abut with one of the two arms or with the other at predetermined moments, and will force the fork to swing from the position shown in Fig. 3 to the position shown in Fig. 4, or vice-versa, this movement is a snap action owing to the action of springs 38 and 40.

It should be noted that pin 36 and also the anchoring screws 39 and 41 are fixed to disc 12—13 with good electric contact with the metal ring or annulus 13.

When star wheel 33 and fork 35 swing from the position of Fig. 3 to the position of Fig. 4, should the winding up not take place owing to lack of current, the star wheel 33 will be able to continue its turning movement in a clockwise direction about its rotation pivot 32, no hindrance whatever being occasioned by fork 35, and it will be able to complete a full revolution from the fully wound up position, whilst fork 35 will in this case remain in the position shown in Fig. 4.

When fork 35 is in the position of Fig. 3, the circuit for the electric motor 21 is open; on the contrary, when said fork is in the position of Fig. 4 the circuit for motor 21 is closed as follows: one conductor of the feeding cable, brush 15, metal ring 13, pin 36, fork 35, spring 43, contact point 44, metal sleeve 18, brush 20, motor 21, the second conductor of the feeding cable.

It is to be noted that fork 35 is electrically connected with ring 13 also through screw 41, spring 40 and star wheel 37.

The operation of the device, starting from the fully wound up position of the mainspring is as follows:

When the clockwork is working, shaft 7 stands still and barrel 3 turns in a clockwise direction as viewed in Figs. 3 and 4. At every turn of said barrel 3 a point of star wheel 33 meets finger 22 and therefore the star wheel is forced to accomplish one seventh of a turn in a clockwise direction about its pivot.

The first turn of barrel 3 causes star wheel 33 to take the position of Fig. 3; when barrel 3 is about to complete its second turn, pin 34 strikes the upper arm of fork 35 (as seen in Fig. 3) and forces said fork to swing, the swinging movement taking place instantaneously owing to the action of springs 38 and 40. Therefore, the contact point 44 will instantaneously contact sleeve 18 and close the circuit through the electric motor. The rotation of the electric motor brings about the rotation of shaft 7 and finger 22 in a clockwise direction (looking at Fig. 4), and finger 22 rotates star wheel 33 in a counter-clockwise direction until pin 34 strikes the lower arm of fork 35 and brings again the latter to the position of Fig. 3. The winding up has been completed again, and the circuit for the electric motor has been broken.

If the current is lacking at the moment that the contact point 44 is pressed on sleeve 18, star wheel 33 will unobstructedly accomplish other angular steps, when barrel 3 further rotates, until the current is restored, and even a full winding off of the spring may be attained, in which case the clockwork will stop.

As soon as the current is restored, the clockwork spring is wound up.

A stop 45 working in the recess 46 in fork 35 determines the extent of the swinging movement of fork 35.

A single device according to this invention can be used to wind up more than one spring, for instance two springs by means of a transmission of the kind shown in Fig. 5 by way of example, which refers to the particular instance of a pendulum clock where there are two springs, one of them for the clockwork and the other for time striking, both of them usually requiring the same number of winding turns. In this case, on the two winding shafts 47 and 48 there are fitted, with the interposition of single-direction couplings, two gears 49, 50 having helical teeth in mesh with two worms 51, 52, both keyed on shaft 53 on which is also keyed a bevel pinion 54 in mesh with a bevel pinion 55 carried by the shaft 56 of the electric motor. Owing to the irreversibleness of the pair formed of the worm gear and helical toothed wheel, in this case the catch 30 which was provided in the first embodiment may be omitted.

The switch with its associated parts, which are not shown in Fig. 5, may indifferently be fitted either to the clockwork spring barrel or to the time striking one.

The above description will no doubt suggest alterations and changes to the mind of those skilled in the art, e. g. modifications designed to apply the invention to a spring device of a different type from the type taken into consideration in the embodiments shown, and it will be understood that such alterations and changes are meant to be included within the scope of this invention.

What I claim is:

1. An electrically controlled device for the automatic winding up of a spring-actuated clockwork comprising, in combination with the clockwork to be wound: an electric motor to which the current is supplied by any suitable source; a reduction gearing connecting the electric motor to the spring winding shaft to cause a rotating motion of said shaft in the spring winding direction when the electric motor revolves; means preventing any movements of the spring winding shaft in the opposite direction to the winding direction; single-direction coupling means arranged between the spring winding shaft and said mechanical drive to allow the manual turning of the winding shaft in the spring winding direction without interfering with the gear drive; an electric switch comprising a carrier for a spring contact, which carrier is shaped as a fork swingably mounted on a pivot pin carried by a disc rotated by the spring barrel and co-axial with the winding shaft, said disc having its central portion made of an insulating material and its peripheral portion made of an electrically conducting material, said pivot pin being in electrical contact with said peripheral part of the disc and also with the fork-shaped part, said electrically conducting peripheral portion of the disc having a circumferential groove wherein a contact brush rests permanently, which is connected to one of the conductors of the mains.

2. An electrically controlled device for the automatic winding up of a spring-actuated clockwork according to claim 1, wherein the electric contact, carried by the fork-shaped carrier, in the closed position of the switch is pressed on a metal sleeve fixed to the winding shaft but electrically insulated from the latter, which sleeve has a circumferential groove wherein a brush rests permanently, this brush being connected to one terminal of the electric motor the other terminal of which is connected to the second conductor of the mains.

3. An electrically controlled device for the automatic winding up of a spring-actuated clockwork according to claim 1, wherein a small star wheel co-axial with the swinging pivot of the fork is fastened to or integral with the fork, with which star wheel a positioning member, co-operates which consists in a spring one end of which is fastened to the disc and the other end of which closely fits either of two recesses between three predetermined points of the star wheel depending on the position taken by the fork, whereby the result is attained that the displacements of the fork take place in a practically instantaneous manner and any sparking or imperfect contacts between the spring contact and metal sleeve is prevented.

References Cited in the file of this patent

UNITED STATES PATENTS

| Number | Name | Date |
|---|---|---|
| 650,842 | Hollar | June 5, 1900 |
| 678,953 | Hookham | July 23, 1901 |
| 1,143,664 | Sundblad | June 2, 1915 |
| 1,299,116 | Bryce | Apr. 1, 1919 |
| 1,301,499 | Pons | Apr. 22, 1919 |

FOREIGN PATENTS

| Number | Country | Date |
|---|---|---|
| 641,733 | France | Apr. 23, 1928 |
| 669,830 | France | Aug. 10, 1929 |
| 755,401 | France | Sept. 4, 1933 |